United States Patent
Zinck et al.

(10) Patent No.: US 12,218,349 B2
(45) Date of Patent: Feb. 4, 2025

(54) RECHARGEABLE BATTERY CELL

(71) Applicant: Innolith Technology AG, Basel (CH)

(72) Inventors: Laurent Zinck, Mothern (FR); Christian Pszolla, Karlsruhe (DE)

(73) Assignee: Innolith Technology AG, Basel (CH)

( * ) Notice: Subject to any disclaimer, the term of this patent is extended or adjusted under 35 U.S.C. 154(b) by 642 days.

(21) Appl. No.: 17/514,894

(22) Filed: Oct. 29, 2021

(65) Prior Publication Data
US 2022/0052333 A1 Feb. 17, 2022

Related U.S. Application Data

(63) Continuation of application No. PCT/EP2020/059913, filed on Apr. 7, 2020.

(30) Foreign Application Priority Data

Apr. 30, 2019 (EP) .................................... 19 171 866

(51) Int. Cl.
*H01M 4/505* (2010.01)
*H01M 4/525* (2010.01)
(Continued)

(52) U.S. Cl.
CPC ........... *H01M 4/505* (2013.01); *H01M 4/525* (2013.01); *H01M 4/623* (2013.01);
(Continued)

(58) Field of Classification Search
CPC ................. H01M 4/505; H01M 4/485; H01M 10/0562; H01M 10/0564; H01M 10/0585; H01M 2300/0065; H01M 2300/0094
See application file for complete search history.

(56) References Cited

U.S. PATENT DOCUMENTS

| 5,910,382 | A | * | 6/1999 | Goodenough | ...... | H01M 4/5825 429/224 |
| 7,422,823 | B2 | * | 9/2008 | Saidi | ...................... | C01B 25/45 429/231.95 |

(Continued)

FOREIGN PATENT DOCUMENTS

| CN | 102742049 A | 10/2012 |
| CN | 103907223 A | 7/2014 |

(Continued)

OTHER PUBLICATIONS

Zhang et al, Recent Advances and Perspectives in Lithium-Sulfur Pouch Cells, Molecules 26 6341, 2021 (Year: 2021).*

(Continued)

*Primary Examiner* — Amanda C. Walke
(74) *Attorney, Agent, or Firm* — Bose McKinney & Evans LLP

(57) ABSTRACT

A rechargeable battery cell has an electrolyte comprising a conducting salt. The electrolyte is based on $SO_2$ and the positive electrode comprises an active material of the composition $A_xM'_yM''_z(XO_{4-m}S_n)$, wherein A is an alkali metal, an alkaline earth metal, a metal of group 12 of the periodic table or aluminum, preferably sodium, calcium, zinc, particularly preferably lithium. M' is at least one metal selected from a group consisting of titanium, vanadium, chromium, manganese, iron, cobalt, nickel, copper and zinc. M" is at least one metal selected from a group consisting of the metals of groups 2, 3, 4, 5, 6, 10, 11, 12, 13, 14, 15 and 16 of the periodic table. X is phosphorus or silicon. x is greater than 0. y is greater than 0. z is greater than or equal to 0. n is greater than 0 and m is less than or equal to n.

26 Claims, 4 Drawing Sheets

(51) Int. Cl.
  *H01M 4/62* (2006.01)
  *H01M 10/0525* (2010.01)
  *H01M 10/0562* (2010.01)
  *H01M 4/02* (2006.01)

(52) U.S. Cl.
  CPC ... *H01M 10/0525* (2013.01); *H01M 10/0562* (2013.01); *H01M 2004/028* (2013.01); *H01M 2220/20* (2013.01); *H01M 2300/0071* (2013.01)

(56) References Cited

U.S. PATENT DOCUMENTS

| | | | |
|---|---|---|---|
| 9,214,700 B2* | 12/2015 | Noh | H01M 4/5825 |
| 9,263,745 B2* | 2/2016 | Zinck | H01M 4/587 |
| 9,478,783 B2 | 10/2016 | Hong et al. | |
| 9,871,252 B2* | 1/2018 | Staffel | H01M 4/5825 |
| 10,535,878 B2* | 1/2020 | Chao | C04B 35/62645 |
| 10,686,193 B2* | 6/2020 | Oh | H01M 10/0525 |
| 10,950,888 B2* | 3/2021 | Gaben | H01M 10/0525 |
| 2011/0287304 A1 | 11/2011 | Zinck et al. | |
| 2013/0040188 A1 | 2/2013 | Zinck et al. | |
| 2014/0197358 A1 | 7/2014 | Nose | |
| 2015/0093632 A1 | 4/2015 | Pszolla et al. | |
| 2017/0250440 A1 | 8/2017 | Nemori et al. | |
| 2018/0261880 A1 | 9/2018 | Marusczyk et al. | |
| 2018/0331390 A1* | 11/2018 | Homma | H01M 10/0525 |
| 2019/0214650 A1* | 7/2019 | Sakamoto | H01M 4/62 |
| 2023/0382763 A1* | 11/2023 | Li | H01M 4/62 |

FOREIGN PATENT DOCUMENTS

| | | | | |
|---|---|---|---|---|
| CN | 104466174 A | 3/2015 | | |
| CN | 105723546 A | 6/2016 | | |
| CN | 107128891 A | 9/2017 | | |
| CN | 108028383 A | 5/2018 | | |
| DE | 102010006440 A1 * | 8/2011 | | H01M 4/362 |
| EP | 2 534 719 B1 | 1/2017 | | |
| JP | 2002-305026 A | 10/2002 | | |
| JP | 2003-157896 A | 5/2003 | | |
| JP | 2013-519968 A | 5/2013 | | |
| KR | 10-2013-0006614 A | 1/2013 | | |
| KR | 10-2014-0064843 A | 5/2014 | | |
| RU | 2 566 085 C1 | 10/2015 | | |
| WO | WO-2018139657 A1 * | 8/2018 | | |

OTHER PUBLICATIONS

English Translation of International Search Report and Written Opinion of the International Searching Agency, PCT/EP2020/059913, Jun. 19, 2020, 8 pages.

Okada et al., High Rate Capability by Sulfur-Doping into LiFePO4 Matrix, RSC Advances, Feb. 6, 2018, vol. 8, No. 11, pp. 5848-5853.

* cited by examiner

RECHARGEABLE BATTERY CELL

RELATED APPLICATIONS

This application is a continuation of PCT/EP2020/059913, filed Apr. 7, 2020, which claims priority to EP 19 171 866.7, filed Apr. 30, 2019, the entire disclosures of both of which are hereby incorporated herein by reference.

BACKGROUND

This disclosure relates to a rechargeable battery cell having a housing, at least one positive electrode, at least one negative electrode and an electrolyte comprising at least one conducting salt.

Rechargeable battery cells are of great importance in many technical fields. They are often used for applications which require only relatively low current intensities, for example, for the operation of cell phones. In addition, there is also a great need for battery cells for high-current applications, wherein mass storage of energy is of particular importance.

High energy density is an important requirement for these types of rechargeable battery cells. This means that the rechargeable battery cell should contain as much electrical energy as possible per unit weight and volume. Lithium has proven to be particularly advantageous as an active metal for this purpose. The active metal of a rechargeable battery cell is the metal, the ions of which migrate within the electrolyte to the negative or positive electrode when the rechargeable battery cell is charged or discharged and there participate in electrochemical processes which lead directly or indirectly to the release of electrons into the external circuit or to the absorption of electrons from the external circuit. Because of this, rechargeable battery cells are almost exclusively lithium-ion cells in practice. Both the positive and negative electrodes of lithium-ion cells are designed as insertion electrodes. The term "insertion electrode" in the sense of this disclosure refers to electrodes which have a crystal structure into which ions of the active material can be stored and removed during operation of the rechargeable battery cell. This means that the electrode processes can take place not only on the surface of the electrodes, but also within the crystalline structure. The negative electrode of lithium-ion cells consists of a carbon coating which is applied to a discharge element made of copper. The positive electrode consists of lithium cobalt oxide ($LiCoO_2$), which is applied to a discharge element made of aluminum. Both electrodes typically have a thickness of less than 100 µm and are therefore very thin. When charging the lithium-ion cell, the ions of the active metal are removed from the positive electrode and stored in the negative electrode. The reverse process takes place when the lithium-ion cell is discharged. The ions are transported between the electrodes by means of the electrolyte, which ensures the required ion mobility. The lithium-ion cells known from the prior art comprise an electrolyte consisting of a conducting salt dissolved in an organic solvent or solvent blend. The conducting salt is a lithium salt such as lithium hexafluorophosphate ($LiPF_6$). The solvent blend can comprise, for example, ethylene carbonate. Due to the organic solvent or solvent blend, these kinds of lithium ion cells are also referred to as organic lithium-ion cells.

Organic lithium-ion cells are problematic in terms of their stability and long-term operational reliability. Safety risks are caused in particular by the flammability of the organic solvent or solvent blend. When an organic lithium-ion cell catches fire or even explodes, the organic solvent in the electrolyte forms a combustible material. Additional measures must be taken to avoid such safety risks. These measures include, in particular, a very precise regulation of the charging and discharging processes of the organic lithium-ion cell and an optimized battery design. Furthermore, the organic lithium-ion cell comprises components which melt in case of fire and can thereby flood the organic lithium-ion cell with molten plastic. However, these measures lead to increased production costs in the manufacture of the organic lithium-ion cell and to an increased volume and weight. Furthermore, these measures reduce the energy density of the organic lithium-ion cell.

The problems described above with regard to stability and long-term operational reliability are particularly serious in the development of organic lithium-ion cells for high-current applications.

A further development known from prior art therefore provides for the use of an electrolyte based on sulfur dioxide ($SO_2$) for rechargeable battery cells. Rechargeable battery cells, which comprise an $SO_2$-based electrolyte, exhibit, among other things, high ionic conductivity. In the context of this disclosure, the term "$SO_2$-based electrolyte" refers to an electrolyte which not only comprises $SO_2$ as an additive in a low concentration, but in which the mobility of the ions of the conducting salt, which is comprised in the electrolyte and causes the charge transport, is at least partially, largely or even completely guaranteed by $SO_2$.

EP 2 534 719 B1 discloses, for example, a rechargeable battery cell having a housing, a positive electrode, a negative electrode and an electrolyte. The electrolyte of said rechargeable battery cell is based on $SO_2$ and comprises a conducting salt. An active material of the positive electrode, which is at least partially responsible for energy storage in said rechargeable battery cell, consists of lithium iron phosphate ($LiFePO_4$). In addition to the non-combustibility of the electrolyte, such rechargeable battery cells exhibit good electrical performance data with regard to their current-carrying capacity and the usability of the theoretical capacity of the positive electrode. Furthermore, they are characterized by an increased number of possible charge and discharge cycles and by a low self-discharge. For example, half-cell measurements with the positive electrode and the $SO_2$-based electrolyte at various current loads resulted in, among other things, a capacity of approx. 155 mAh/g at a discharge current intensity of 1 C and a capacity of approx. 130 mAh/g at a discharge current intensity of 4 C. By definition, the nominal capacity of a cell is discharged in one hour with a discharge rate of 1 C.

SUMMARY

In order to further improve the possible uses and properties of rechargeable battery cells having an $SO_2$-based electrolyte, this disclosure specifies a rechargeable battery cell that, compared to the rechargeable battery cells known from the prior art, exhibits:
improved electrical performance data, in particular high energy density with simultaneously high currents that can be drawn (power density),
increased operational safety, even under the difficult environmental conditions in a vehicle,
increased service life, in particular a high number of usable charge and discharge cycles,
reduced production costs in terms of the necessary starting materials and the production process, and
improved overcharging and deep discharging capabilities.

Such rechargeable battery cells should in particular also be suitable for high-current applications. High-current cells in the sense of this disclosure are rechargeable battery cells which, at nominal voltage, exhibit a current-carrying capacity, based on the electrode surface (hereinafter referred to as "area-specific current-carrying capacity"), of at least 10 mA/cm$^2$, preferably at least 50 mA/cm$^2$ and particularly preferred at least 150 mA/cm$^2$.

A rechargeable battery cell according to this disclosure comprises a housing, at least one positive electrode, at least one negative electrode and an electrolyte comprising at least one conducting salt. The electrolyte is based on $SO_2$. The positive electrode comprises an active material of the composition $A_xM'_yM''_z(XO_{4-m}S_n)$. Here, A is an alkali metal, an alkaline earth metal, a metal from group 12 of the periodic table or aluminum. A can preferably be sodium, calcium, zinc, particularly preferably lithium. M' is at least a metal selected from the group consisting of the elements titanium, vanadium, chromium, manganese, iron, cobalt, nickel, copper and zinc. M'' is at least one metal which is selected from a group consisting of the metals of groups 2, 3, 4, 5, 6, 10, 11, 12, 13, 14, 15 and 16 of the periodic table. X is selected from a group consisting of the elements phosphorus and silicon. x is greater than 0. y is greater than 0. z is greater than or equal to 0. n is greater than 0. m is less than or equal to n. S is the element sulfur.

In the sense of this disclosure, the term "at least one metal" refers to the fact that the components M' and M'' can each consist of either one or two or more of the metals mentioned. The suffixes y and z relate to the number of moles of the totality of metals represented by M' and M'', respectively.

Of course, the condition of charge neutrality must be observed with regard to the general formula $A_xM'_yM''_z(XO_{4-m}S_n)$. This means that the sum of the positive charges of the components A, M' and M'' must be equal to the sum of the negative charges of the components $(XO_{4-m}S_n)$. The suffixes x, y, z, (4-m) and n represent the respective number of moles of components A, M', M'', X, O and S in the formula $A_xM'_yM''_z(XO_{4-m}S_n)$. n specifies the number of moles of sulfur atoms in the aforementioned formula. m specifies the number of moles by which the 4 moles of oxygen atoms are reduced. In the case of n=m, the negative charge of the replaced oxygen has to be replaced by the negative charge of sulfur due to charge neutrality. This means that an oxygen $O^{2-}$ is replaced by a sulfur $S^{2-}$. If n is greater than m, some of the sulfur atoms may not have any charge, as otherwise charge neutrality would no longer be maintained. This means, that in this case, both charged $S^{2-}$ ions and uncharged S atoms are present in the compound.

Positive Electrode

Advantageous embodiments and further developments of the rechargeable battery cell according to this disclosure with regard to the positive electrode are described below:

A first advantageous embodiment of the rechargeable battery cell according to this disclosure provides that m assumes at least a value of 0.001, preferably at least a value of 0.005, more preferably at least a value of 0.01, more preferably at least a value of 0.05 and most preferably at least a value of 0.1.

In a further advantageous embodiment of the rechargeable battery cell according to this disclosure, A is the metal lithium in the active material $A_xM'_yM''_z(XO_{4-m}S_n)$, X the element phosphorus and M' the metal iron. The active material of the positive electrode is therefore preferably a compound of the formula $LiFe(PO_{4-m}S_n)$, wherein n is greater than 0 and m is less than or equal to n. Examples of compounds of this formula are $LiPO_4S_{0.025}$, $LiFePO_{3.95}S_{0.05}$, $LiFePO_{3.975}S_{0.025}$ or $LiFePO_{3.975}S_{0.05}$. A compound of the formula $LiFe(PO_{4-m}S_n)$ is also referred to below as sulfur-doped lithium iron phosphate (LFPS).

As mentioned earlier, the active material of the positive electrode $A_xM'_yM''_z(XO_{4-m}S_n)$ has, among other things, the component A as an active metal. Component A can preferably be an alkali metal, in particular lithium. In this case, the rechargeable battery cell is designed as an alkali metal cell or as a lithium cell. Lithium cells having an $SO_2$-based electrolyte are referred to below as lithium-$SO_2$ cells (without loss of generality).

In a further advantageous embodiment of the rechargeable battery cell according to this disclosure, the positive electrode preferably has a thickness of at least 0.25 mm, more preferably at least 0.3 mm, more preferably at least 0.4 mm, more preferably at least 0.5 mm and most preferably at least 0.6 mm. The positive electrode thus has a significantly greater thickness compared to the electrodes used in organic lithium-ion cells. A higher area-specific capacity can be achieved with this great thickness. The term "area-specific capacity" refers to the capacity of the positive electrode related to the area of the positive electrode. The area-specific capacity of the positive electrode is preferably at least 5 mAh/cm$^2$, wherein the following minimum values are even more preferred in this order: 7.5 mAh/cm$^2$, 10 mAh/cm$^2$, 12.5 mAh/cm$^2$, 15 mAh/cm$^2$, 20 mAh/cm$^2$, 25 mAh/cm$^2$. The maximum thickness of the positive electrode should not exceed 5.0 mm, preferably 3.0 mm and more preferably 1.0 mm.

A further advantageous embodiment of the rechargeable battery cell according to this disclosure provides that the positive electrode, based on its area, comprises at least 30 mg/cm$^2$, preferably at least 40 mg/cm$^2$, more preferably at least 60 mg/cm$^2$, more preferably at least 80 mg/cm$^2$, more preferably at least 100 mg/cm$^2$, more preferably at least 120 mg/cm$^2$, and most preferably at least 140 mg/cm$^2$ of the active material. The amount of active material based on the area of the positive electrode is the loading on said positive electrode. The maximum loading of the positive electrode should preferably not exceed 1000 mg/cm$^2$, more preferably 750 mg/cm$^2$ and more preferably 500 mg/cm$^2$ and most preferably 250 mg/cm$^2$.

A high loading of the positive electrode with active material and the associated high area-specific capacity make it possible to manufacture rechargeable battery cells which have a relatively small electrode area with a high total capacity. For example, only an area of 60 cm$^2$ is required when an LFPS electrode is loaded with 100 mg/cm$^2$ for a desired capacity of 1 Ah. The required electrode area is smaller by a factor of 3 than for the organic lithium-ion cells known from the prior art. Positive electrodes which comprise $LiFePO_4$ as the active material and are found in organic lithium-ion cells have a thickness of 50 to 90 µm and a surface loading of 4 to 6 mAh/cm$^2$. As a result, they require a total electrode area of 170 to 250 cm$^2$ to provide a capacity of 1 Ah.

Less area is required on the separator and on the negative electrode due to the reduced electrode area of the positive electrode. In addition, in the case of, for example, a prismatic cell having a plurality of electrodes, a smaller number of conductor lugs is required for connection to the cell poles, and the connection of the electrodes in the housing is much simpler with a small number of electrodes. This in particular results in easier manufacture of the rechargeable battery cell and reduced production costs.

In a further advantageous embodiment, the rechargeable battery cell exhibits a current-carrying capacity, based on the area of the positive electrode, of at least 10 mA/cm$^2$, preferably at least 50 mA/cm$^2$ and particularly preferably at least 150 mA/cm$^2$.

A further advantageous development of the rechargeable battery cell according to this disclosure provides that the positive electrode is porous. The porosity is preferably at most 50%, more preferably at most 45%, more preferably at most 40%, more preferably at most 35%, more preferably at most 30%, more preferably at most 20% and most preferably at most 10%. This porosity represents the ratio of the cavity volume to the total volume of the positive electrode, wherein the cavity volume is formed by so-called pores or cavities. The porosity leads to an increase in the inner surface area of the electrode. Furthermore, the porosity has a great influence on the density of the electrodes and thus on their weight. The individual pores of the positive electrode can preferably be completely filled with the electrolyte during operation.

In a further advantageous embodiment, the positive electrode has at least one discharge element having a three-dimensional, porous metal structure, in particular in the form of a metal foam. This means that the positive electrode also comprises the discharge element in addition to the active material. The term "three-dimensional porous metal structure" refers to any structure consisting of metal that not only extends over the length and width of the flat electrode like a thin metal sheet, but also over its thickness dimension. The three-dimensional porous metal structure is sufficiently porous such that the active material of the positive electrode can be incorporated into the pores of the metal structure. This amount of incorporated active material is the previously described loading of the positive electrode. The discharge element serves to enable the required electronically conductive connection of the active material of the positive electrode. For this purpose, the discharge element is in contact with the active material involved in the electrode reaction of the positive electrode. The discharge element and the active material form a positive insertion electrode. The porous metal structure can preferably extend essentially over the entire thickness of the positive electrode. "Essentially" means that the porous metal structure extends over at least 70%, but preferably over at least about 80% of the thickness of the electrode. The three-dimensional, porous metal structure of the discharge element enables a higher loading of the positive electrode and thus improves the electronically conductive connection of the active material. Because of this, the three-dimensional, porous metal structure of the discharge element leads to improved electrical performance data of the rechargeable battery cell. It is within the scope of this disclosure for the three-dimensional porous metal structure to also be able to be designed as a metal non-woven material or metal woven material.

A further advantageous embodiment of the rechargeable battery cell according to this disclosure provides that the active material of the positive electrode is distributed essentially homogeneously in the porous metal structure. Said homogeneous distribution further improves the electrical performance data of the rechargeable battery cell.

In order to improve the mechanical strength, the positive electrode comprises at least one binder in a further advantageous embodiment of all aspects of this disclosure. Said binder can be a fluorinated binder, in particular an ethylene tetrafluoroethylene (ETFE), a polytertrafluoroethylene (PTFE), a fluoroethylene propylene (FEP), perfluoroalkoxy polymers (PFA), a polyvinylidene fluoride (PVDF) and/or a terpolymer made from tetrafluoroethylene, hexafluoropropylene and vinylidene fluoride (THV). Furthermore, the binder can be formed from a polymer which is built up from monomeric structural units of a conjugated carboxylic acid or from the alkali, alkaline earth or ammonium salt of said conjugated carboxylic acid or from a combination thereof. The binder can also be formed from a polymer based on monomeric styrene and butadiene structural units. The binder can also be a binder from the group of the carboxyalkyl celluloses and their salts. THV and PVDF in particular have proven themselves in the context of this disclosure. At least one of the aforementioned binders can be present in the positive electrode, preferably in a concentration of at most 20% by weight, more preferably at most 15% by weight, more preferably at most 10% by weight, more preferably at most 7% by weight, more preferably at most 5% by weight and most preferably at most 2% by weight based on the total weight of the positive electrode. The addition of a binder improves the long-term stability and service life of the rechargeable battery cell.

Negative Electrode

Further advantageous embodiments and developments of the rechargeable battery cell according to this disclosure with regard to the negative electrode are described below.

The negative electrode is also an insertion electrode. It thus consists of an electrode material, in which the ions of the active metal can be stored during the charging of the rechargeable battery cell and from which the ions of the active metal can be removed during the discharging of the rechargeable battery cell. If, for example, a conducting salt based on lithium is used, then lithium ions can be stored in the electrode material while the rechargeable battery cell is being charged and can be removed therefrom while the rechargeable battery cell is being discharged.

A further advantageous embodiment of the rechargeable battery cell according to this disclosure provides that the negative electrode is also porous, wherein the porosity is preferably at most 50%, more preferably at most 45%, more preferably at most 40%, more preferably at most 35%, more preferably at most 30%, more preferably at most 20% and most preferably at most 10%. This porosity leads to an increase in the inner surface area of the negative electrode. Furthermore, the porosity reduces the density of the negative electrode and thus also its weight. The individual pores of the negative electrode can preferably be completely filled with the electrolyte during operation.

Furthermore, in a further advantageous embodiment of the rechargeable battery cell according to this disclosure, the negative electrode has at least one discharge element having a three-dimensional porous metal structure, in particular in the form of a metal foam. This means that the negative electrode also comprises the discharge element in addition to the active material. As already explained above, the term "three-dimensional porous metal structure" refers to any structure consisting of metal that not only extends like a thin sheet over the length and width of the flat electrode, but also over its thickness dimension. The three-dimensional porous metal structure is sufficiently porous such that the active material of the negative electrode can be incorporated into the pores of the metal structure. This amount of incorporated active material is the loading on the negative electrode. The discharge element of the negative electrode serves to enable the required electronically conductive connection of the active material of the negative electrode. For this purpose, the discharge element is in contact with the active material involved in the electrode reaction of the negative electrode. The discharge element and the active material form a negative insertion electrode. The porous metal structure can preferably extend essentially over the entire thickness of the negative electrode. "Essentially" means that the porous metal structure extends over at least 70%, but preferably over at least about 80% of the thickness of the negative electrode. The three-dimensional, porous metal structure of the discharge element enables a higher loading of the negative electrode and thus improves the electronically conductive connection of the active material. Because of this, the three-dimensional, porous metal structure of the discharge element leads to improved electrical performance data of the rechargeable battery cell. It is within the scope of this disclosure for the three-dimensional porous metal structure to also be able to be designed as a metal non-woven material or metal woven material.

In a further advantageous embodiment of the rechargeable battery cell according to this disclosure, the negative electrode comprises carbon as the active material. Said carbon can in particular be present as the allotrope graphite. Due to their crystal structure, both carbon and graphite can serve to absorb ions of the active metal during the charging process of the rechargeable battery cell. The carbon can also be present in the form of natural graphite (flake-shaped or rounded), synthetic graphite (mesophase graphite), graphitized mesocarbon microbeads (MCMB), graphites coated with carbon or amorphous carbon (hard carbon and soft carbon).

In a further advantageous embodiment of the rechargeable battery cell according to this disclosure, the negative electrode comprises lithium-intercalation anode active materials that do not comprise carbon, such as lithium titanates (for example, $Li_4Ti_5O_{12}$).

In a further advantageous embodiment of the rechargeable battery cell according to this disclosure, the negative electrode comprises anode active materials which form alloys with lithium. These are, for example, lithium-storing metals and metal alloys (Si, Ge, Sn, $SnCo_xC_y$, $SnSi_x$, . . . ) and oxides of lithium-storing metals and metal alloys ($SnO_x$, $SiO_x$, oxidic glasses of Sn, Si, . . . ).

In a further advantageous embodiment of the rechargeable battery cell according to this disclosure, the negative electrode comprises conversion anode active materials, such as transition metal oxides ($MnO_x$, $FeO_x$, $CoO_x$, $NiO_x$, $CuO_x$, . . . ) or metal hydrides ($MgH_2$, $TiH_2$, $AlH_3$, etc.; B-, Al- and Mg-based ternary hydrides).

In a further advantageous embodiment of the rechargeable battery cell according to this disclosure, the negative electrode comprises a metal, for example, metallic lithium.

A further advantageous embodiment of the rechargeable battery cell according to this disclosure provides that the active material of the negative electrode is distributed essentially homogeneously in the porous metal structure of the discharge element of the negative electrode. Said homogeneous distribution further improves the electrical performance data of the rechargeable battery cell.

In a further advantageous embodiment of the rechargeable battery cell according to this disclosure, the negative electrode preferably has a thickness of at least 0.2 mm, more preferably at least 0.3 mm, more preferably at least 0.4 mm, more preferably at least 0.5 mm and most preferably at least 0.6 mm. The thickness of the negative electrode is also significantly greater compared to negative electrodes which are used in organic lithium-ion cells.

A further advantageous embodiment of the rechargeable battery cell according to this disclosure provides that the amount of active material of the negative electrode, that is, the loading of the electrode, based on its area, is at least 10 mg/cm$^2$, preferably at least 20 mg/cm$^2$, more preferably at least 40 mg/cm$^2$, more preferably at least 60 mg/cm$^2$, more preferably at least 80 mg/cm$^2$ and most preferably at least 100 mg/cm$^2$. This amount of active material of the negative electrode has a positive effect on the charging process and the discharging process of the rechargeable battery cell.

The area-specific capacity of the negative electrode can preferably be at least 2.5 mAh/cm$^2$, wherein the following values are further preferred in this order: 5 mAh/cm$^2$, 10 mAh/cm$^2$, 15 mAh/cm$^2$, 20 mAh/cm$^2$, 25 mAh/cm$^2$, 30 mAh/cm$^2$.

In order to improve the mechanical strength, the negative electrode comprises at least one binder in a further advantageous embodiment of all aspects of this disclosure. Said binder can be a fluorinated binder, in particular an ethylene tetrafluoroethylene (ETFE), a polytertrafluoroethylene (PTFE), a fluoroethylene propylene (FEP), perfluoroalkoxy polymers (PFA), a polyvinylidene fluoride (PVDF) and/or a terpolymer made from tetrafluoroethylene, hexafluoropropylene and vinylidene fluoride (THV). Furthermore, the binder can be formed from a polymer which is built up from monomeric structural units of a conjugated carboxylic acid or from the alkali, alkaline earth or ammonium salt of said conjugated carboxylic acid or from a combination thereof. The binder can also be formed from a polymer based on monomeric styrene and butadiene structural units. The binder can also be a binder from the group of the carboxyalkyl celluloses and their salts. Polymers made from an alkali salt of a conjugated carboxylic acid have proven themselves in the context of this disclosure. At least one of the aforementioned binders can be present in the negative electrode, preferably in a concentration of at most 20% by weight, more preferably at most 15% by weight, more preferably at most 10% by weight, more preferably at most 7% by weight, more preferably at most 5% by weight and most preferably at most 2% by weight based on the total weight of the positive electrode. The addition of a binder improves the long-term stability and service life of the rechargeable battery cell.

$SO_2$-Based Electrolyte

Advantageous embodiments and developments of the rechargeable battery cell according to this disclosure with regard to the $SO_2$-based electrolyte are described below.

As already described above, the rechargeable battery cell according to this disclosure comprises an "$SO_2$-based electrolyte". The electrolyte therefore comprises $SO_2$ not only as an additive in a low concentration, but in concentrations at which the mobility of the ions of the conducting salt, which is comprised in the electrolyte and causes the charge transport, is at least partially, largely or even completely ensured by the $SO_2$.

A further advantageous embodiment of the rechargeable battery cell according to this disclosure provides that the electrolyte comprises at least 1.5 mol $SO_2$, 2 mol $SO_2$, preferably at least 2.5 mol $SO_2$, more preferably at least 3 mol $SO_2$, and most preferably at least 4 mol $SO_2$ per mole of conducting salt. Electrolytes based on $SO_2$ having such a concentration ratio between $SO_2$ and the conducting salt have the advantage in that they can dissolve a larger amount of conducting salt compared to electrolytes known from the prior art, which are based, for example, on an organic solvent blend. In the context of this disclosure, it was found that, surprisingly, an electrolyte having a relatively low concentration of conducting salt is advantageous despite the associated higher vapor pressure, in particular with regard to its stability over many charge and discharge cycles of the rechargeable battery cell.

It is within the scope of this disclosure for the concentration of $SO_2$ to be preferably at most 220 mol $SO_2$ per mole of conducting salt, more preferably at most 200 mol $SO_2$, more preferably at most 100 mol $SO_2$, more preferably at most 50 mol $SO_2$, more preferably at most 30 mol of $SO_2$, more preferably at most 25 mol of $SO_2$ and most preferably at most 20 mol of $SO_2$, in each case per mole of conducting salt. The concentration of $SO_2$ in the electrolyte affects its conductivity. The conductivity of the electrolyte can thus be adjusted to the planned use of a rechargeable battery cell by choosing the $SO_2$ concentration.

The electrolyte can preferably comprise at least 20% by weight (% by weight) $SO_2$ based on the total amount of the electrolyte comprised in the rechargeable battery cell, wherein values of 35% by weight $SO_2$, 45% by weight $SO_2$ and 55% by weight $SO_2$ are more preferred. The electrolyte can also comprise up to 95% by weight $SO_2$, wherein maximum values of 75% by weight $SO_2$ and 85% by weight $SO_2$ are preferred in this order.

It is within the scope of this disclosure for the electrolyte to preferably have only a small percentage or even no percentage of at least one organic substance or an organic material. The proportion of organic substances or materials in the electrolyte, which is present, for example, in the form of one or a plurality of solvents or additives, can preferably be at most 50% by weight of the weight of the electrolyte. Lower proportions of at most 40% by weight, at most 30% by weight, at most 20% by weight, at most 15% by weight, at most 10% by weight, at most 5% by weight or at most 1% by weight of the electrolyte weight are particularly preferred. More preferably, the electrolyte is free of organic solvents. Due to the low proportion of organic substances or materials or even their complete absence, the electrolyte is either hardly combustible or not at all combustible. This increases the operational safety of a rechargeable battery cell operated using such an $SO_2$-based electrolyte. Furthermore, the organic substance or the organic material can preferably not be an additive, but merely an impurity. Such impurities can be caused, for example, by a carbon-containing sheath of the active material of the positive electrode or by other carbon-containing materials, for example, the negative electrode. The $SO_2$-based electrolyte is particularly preferably essentially free of organic materials. The term "essentially" is to be understood to mean that the amount of any organic substances or materials that may be present is so small that they do not represent any safety risk. This means that the electrolyte preferably does not comprise more than 500 ppm of organic substances or materials.

The electrochemical amount of charge of the $SO_2$ comprised in the rechargeable battery cell, calculated with one faraday per mole of $SO_2$, is preferably greater than an amount of charge of the active metal that can theoretically be electrochemically stored in the positive electrode.

A further advantageous embodiment of the rechargeable battery cell according to this disclosure provides that the conducting salt is an aluminate, halide, oxalate, borate, phosphate, arsenate or gallate of an alkali metal or alkaline earth metal, preferably a lithium tetrahaloaluminate, particularly preferably a lithium tetrachloroaluminate. The content of the conducting salt in the electrolyte can preferably be less than 70% by weight of the weight of the electrolyte, more preferably less than 60% by weight, less than 50% by weight, less than 40% by weight, less than 30% by weight, less than 20% by weight or less than 10% by weight.

The total content of $SO_2$ and conducting salt can preferably be greater than 50% by weight of the weight of the electrolyte, more preferably greater than 60% by weight, greater than 70% by weight, greater than 80% by weight, greater than 85% by weight, greater than 90% by weight, greater than 95% by weight or greater than 99% by weight.

Separator

It is within the scope of this disclosure for the rechargeable battery cell to preferably have a separator for the electrical separation of the positive and negative electrodes. Said separator can be formed from a non-woven material, a membrane, a woven material, a knitted material, an organic material, an inorganic material or a combination thereof. Organic separators can consist of unsubstituted polyolefins (for example, polypropylene or polyethylene), partially to completely halogen-substituted polyolefins (for example, partially to completely fluorine-substituted, for example, PVDF, ETFE, PTFE), polyesters, polyamides or polysulfones. Separators that represent a combination of organic and inorganic materials are, for example, glass fiber textile materials in which the glass fibers are provided with a suitable polymer coating. The coating preferably comprises a fluorine-containing polymer such as polytetrafluoroethylene (PTFE), ethylene-tetrafluoroethylene (ETFE), perfluoroethylene propylene (FEP), THV (terpolymer of tetrafluoroethylene, hexafluoroethylene and vinylidene fluoride) or a perfluoroalkoxy polymer (PFA), or it comprises an aminosilane, polypropylene or polyethylene (PE).

Structure of the Rechargeable Battery Cell

Advantageous embodiments and developments of the rechargeable battery cell according to this disclosure are described below with regard to their structure.

In order to further improve the function of the rechargeable battery cell, a further advantageous embodiment of the rechargeable battery cell according to this disclosure provides that the rechargeable battery cell comprises a plurality of negative electrodes and a plurality of positive electrodes, which are stacked alternately in the housing, wherein each positive or each negative electrode is enveloped by a sheath.

A sheath on the positive electrode leads to more uniform ion migration and ion distribution in the rechargeable battery cell. The more even the ion distribution, in particular in the negative electrode, the higher the possible loading of the active materials of the electrode and, as a result, the usable capacity of the rechargeable battery cell. At the same time, risks are avoided that could be associated with uneven loading and the resulting deposition of the active metal. These advantages are particularly effective when the positive electrodes of the cell are enveloped in the sheath.

The surface dimensions of the electrodes and the sheath can preferably be matched to one another such that the external dimensions of the sheath of the electrodes and the external dimensions of the unsheathed electrodes match at least in one dimension.

The surface area of the sheath can preferably be greater than the surface area of the electrode. In this case, the sheath extends beyond a boundary of the electrode. Two layers of the sheath covering the electrode on both sides can therefore be connected to one another at the edge of the positive electrode by an edge connection.

In a further advantageous embodiment of the rechargeable battery cell according to this disclosure, the negative electrodes have a sheath, while the positive electrodes have no sheath. The sheath serves as a separator for the electrical separation of the positive and negative electrodes. The sheath can be formed from a non-woven material, a membrane, a woven material, a knitted material, an organic material, an inorganic material or a combination thereof. Materials for the sheath can be, for example, the materials described in the section labelled "Separator."

A rechargeable battery cell according to this disclosure has the advantage over the rechargeable battery cells known from the prior art, in particular over organic lithium-ions cells, in that it meets the requirements mentioned above and thus exhibits:
- improved electrical performance data,
- increased operational safety,
- increased service life,
- decreased production costs, and
- improved overcharging and deep discharging capabilities.

As part of the development of the rechargeable battery cell according to this disclosure and its advantageous embodiments and developments, the applicant performed preliminary tests in order to be able to estimate or determine the potential that rechargeable battery cells, which have a positive electrode and comprise LFPS as an active material, would have. For these preliminary tests, the applicant performed electrochemical half-cell experiments at room temperature both with a positive electrode comprising LFPS as the active material and with a positive electrode comprising $LiFePO_4$ without sulfur doping as the active material. In the following, the term "LFPS electrode" is used for a positive electrode which comprises LFPS as an active material. The term "LFP electrode" is used for a positive electrode which comprises $LiFePO_4$ without sulfur doping as an active material. The half-cells thus had either an LFPS electrode dipped in the $SO_2$-based electrolyte or an LFP electrode and a negative lithium electrode and a lithium electrode as a reference electrode. Such electrochemical half-cell experiments are standard experiments for testing the performance data of electrodes due to their simple structure and the associated low experimental effort. They are therefore used in the development of rechargeable battery cells, which have a significantly more complex structure, as generally recognized preliminary tests.

For example, it should be investigated whether LFPS electrodes are stable in an $SO_2$-based electrolyte. A problematic property of $SO_2$-based electrolytes is their high corrosiveness. In contrast to this, electrolytes which are based on an organic solvent exhibit significantly low or even no corrosiveness. Since both the positive and the negative electrode in the rechargeable battery cell are in contact with the electrolyte, when composing the electrodes, attention must be paid to their durability in the $SO_2$-based electrolyte. Long-term stability of the rechargeable battery cell is only guaranteed when the LFPS electrodes are stable in the $SO_2$-based electrolyte.

On the other hand, it is generally known that the element sulfur can exist in many different oxidation states. These are of different stability and can, depending on the ambient conditions and reactants, easily merge into one another. Sulfur is present in a very low oxidation state on the surface of a positive electrode which comprises LFPS as an active material. Sulfur is present in high oxidation states in the electrolyte. In an $SO_2$-based electrolyte, it can lead to an undesired adjustment of the oxidation states.

The applicant's half-cell electrochemical experiments revealed that the LFPS electrode has a higher nominal capacity than the LFP electrode of 162 mAh/g after the first formation cycles. The LFP electrode only exhibits a nominal capacity of 148 mAh/g. A rechargeable battery cell having an LFPS electrode can thus store a larger amount of electrical charge. However, in the further course, it was shown that, with the LFPS electrode, there was a significantly steeper loss of capacity after just a few cycles. As a result, the capacity of the LFP electrode was reached after approx. 80 cycles. The advantage of the higher nominal capacity of an LFPS electrode is used up after only about 80 cycles. In addition, there was a further loss of capacity of the LFPS electrode even after the LFP electrode had reached its capacity situation. LFPS electrodes thus show significantly worse cycle behavior than LFP electrodes in electrochemical half-cell experiments in an $SO_2$-based electrolyte. The term "cycle behaviour" refers to the behavior of the electrodes during alternating and repeated charging and discharging processes.

Because of this negative result of the LFPS electrodes in the half-cell experiments, a standard procedure from the point of view of one skilled in the art would not have been to perform any further experiments with the LFPS electrodes after these preliminary experiments, but rather to discard the idea on which this disclosure is based. Nevertheless, the applicant performed further experiments with a rechargeable battery cell, that is, with a full cell. Said full cell had at least one positive electrode and two negative electrodes, wherein the positive electrode was either an LFPS electrode or an LFP electrode. The electrodes were separated by a separator and arranged in a battery housing. The full cell was furthermore filled with the $SO_2$-based electrolyte. Said rechargeable battery cell or full cell is therefore a lithium-$SO_2$ cell. A more detailed explanation of the structure can be found in the following description of the figures.

In the context of this full cell experiment, it was surprisingly found that, despite the rather negative results in half-cell experiments, improved electrical performance data could be achieved when an LFPS electrode was used in a rechargeable battery cell having the $SO_2$-based electrolyte. Compared to a rechargeable battery cell that comprises LFP as the active material of the positive electrode, unpredictable but significantly better cycle results were achieved using a rechargeable battery cell that comprises LFPS as the active material of the positive electrode.

In particular, through the combination of the previously described LFPS electrode and the $SO_2$-based on electrolyte, a rechargeable battery cell can be produced that exhibits the following improvements:
- At least 95% of the theoretical capacity of the LFPS electrode can be used in practice. This means that the lithium ions can be almost completely removed from the positive electrode during charging and can be stored again in the positive electrode during discharging. The practical usable capacity, that is, the nominal capacity, of the rechargeable battery cell is higher than that of a battery cell having an LFP electrode.
- The service life of the rechargeable battery cell having an LFPS electrode is extended by its high nominal capacity. The critical discharge capacity (for example, 60% of the nominal capacity) is only reached after a plurality of charge/discharge cycles. Better values are also achieved according to this disclosure with regard to the capacity as a function of the current-carrying capacity. In other words, even with a high current load, a large part of the original capacity of the battery cell is still available.
- The loss of capacity when a coating layer is formed in the first cycle is less than 10% of the theoretical capacity of the negative electrode. A stable coating layer is formed, which enables a high number of charge and discharge cycles.
- The current-carrying capacity is very high. LFPS electrodes can, for example, provide an area-specific current load of 300 mA/cm2.

The high number of charge and discharge cycles required for mass storage is possible. More than 10,000 full cycles were achieved in the experimental testing.

The self-discharge of the rechargeable battery cell is extremely low. It can therefore be stored for a long time in the charged state and used immediately without recharging.

It is not necessary to use a relatively high proportion of conductivity enhancers based on carbon in the active material of the positive electrode. Rather, relatively small amounts of conductivity enhancer are sufficient. The carbon content of the positive electrode is preferably less than 10% by weight, wherein the following maximum values are further preferred in this order: 7% by weight, 5% by weight, 2% by weight.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
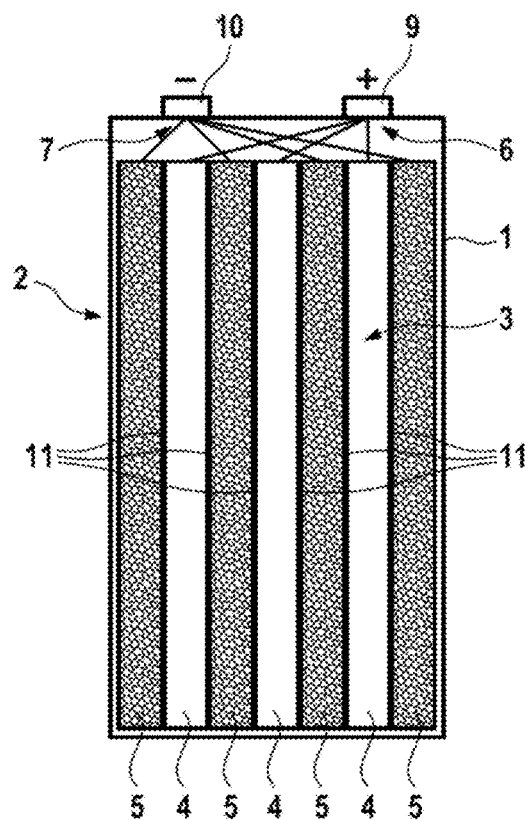
FIG. 1 shows an embodiment of a rechargeable battery cell according to this disclosure in a cross-sectional illustration.

FIG. 1 shows an embodiment of a rechargeable battery cell 2 according to this disclosure in a cross-sectional illustration. Said rechargeable battery cell is designed as a prismatic cell and has a housing 1, among other things. Said housing 1 encloses an electrode array 3 which comprises three positive electrodes 4 and four negative electrodes 5. The positive electrodes 4 and the negative electrodes 5 are stacked alternately in the electrode array 3. The housing 1 can, however, also accommodate more positive electrodes 4 and/or negative electrodes 5. In general, it is preferred when the number of negative electrodes 5 is one greater than the number of positive electrodes 4. This has the consequence of the outer end faces of the electrode stack being formed by the electrode surfaces of the negative electrodes 5. Electrodes 4, 5 are connected to corresponding contacts 9, 10 of the battery cell via electrode connections 6, 7. The rechargeable battery cell is filled with an $SO_2$-based electrolyte such that the electrolyte penetrates as completely as possible into all pores or cavities, in particular within the electrodes 4, 5. The electrolyte is not visible in FIG. 1. In the present embodiment, the three positive electrodes 4 are designed as LFPS electrodes. According to the special embodiment described here, this means that they have $LiFePO_{3.975}S_{0.025}$ as the active material.

The electrodes 4, 5 are designed flat in the present embodiment, that is, as layers having a thickness that is small as compared to their surface area. They are each separated from one another by separators 11. The housing 1 of the depicted battery cell is essentially designed in the form of a rectangular parallelepiped, wherein the electrodes 4, 5 and the walls of the housing 1 shown in a sectional illustration extend perpendicular to the plane of the drawing and are essentially straight and flat. However, the rechargeable battery cell can also be designed as a winding cell. In a winding cell, the electrodes consist of thin layers that are wound up together with a separator material. The separator material separates the positive electrode and the negative electrode spatially and electrically but is permeable to the ions of the active metal, among other things. In this way, large electrochemically effective surfaces are created, which enable a correspondingly high current yield.

Figure 2:
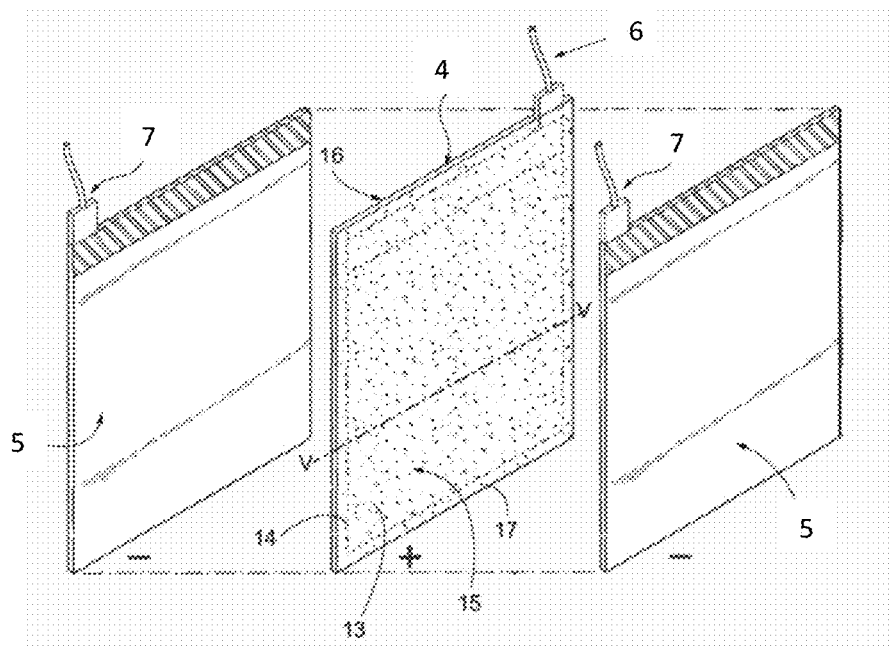
FIG. 2 shows a perspective illustration of one positive and two negative electrodes of an electrode stack with a enveloped positive electrode.

Two negative electrodes 5 and one positive electrode 4 are shown in FIG. 2. Each of the electrodes has an electrode connection wire 6 or 7 for connection to the corresponding contacts 9 or 10 of the cell.

In the preferred embodiment shown, the positive electrode 4 (preferably all positive electrodes 4 of the cell) is enveloped by a sheath 13. In this case, the surface area of the sheath 13 is greater than a surface area of the electrode 4, the boundary 14 of which is shown in FIG. 2 as a dashed line. Two layers 15 and 16 of the sheath material covering the electrode 4 on both sides are connected to one another at the edge of the electrode 4 by an edge connection 17.

The electrodes 4, 5 also have a discharge element which serves to enable the required electronically conductive connection of the active material of the respective electrode. Said discharge element is in contact with the active material involved in the electrode reaction of the respective electrode 4, 5. The discharge element of the positive electrode 4 and the discharge element of the negative electrode 5 are designed in the form of a porous metal foam. The metal foam extends over the thickness dimension of electrodes 4, 5. The active material of the positive electrodes 4 and the negative electrodes 5 was incorporated into the pores of said metal foam.

During the production of the positive electrodes 4, LFPS is incorporated into the porous structure of the discharge element in such a way that it fills its pores uniformly over the entire thickness of the metal structure. The material produced in this way is then pressed under high pressure, wherein the thickness after the pressing process is preferably a maximum of 50%, particularly preferably a maximum of 40%, of the initial thickness.

The positive electrode 4 has a high loading of active material and is therefore very thick. In the case illustrated, the loading is approx. 14 $mAh/cm^2$ and the thickness d is approx. 0.6 mm.

Figure 3:
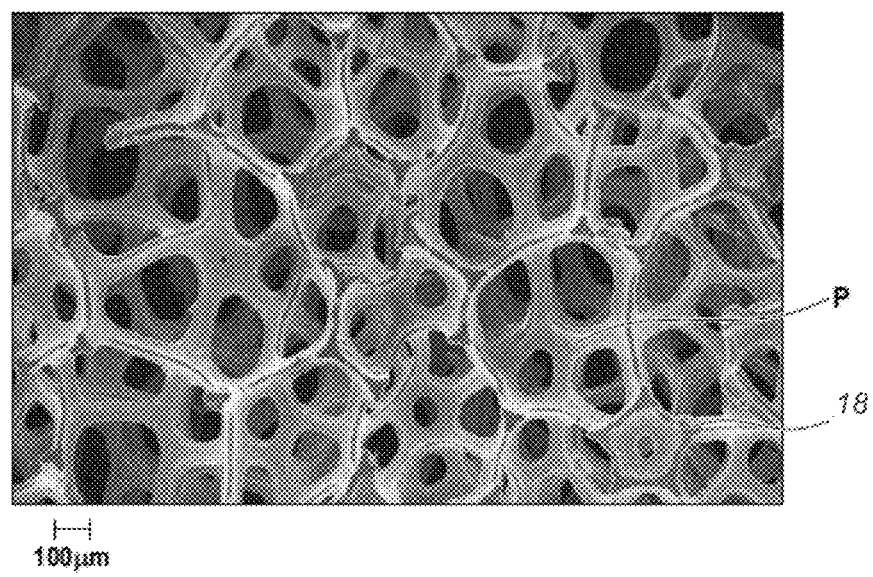
FIG. 3 shows a metal foam that can be used in the embodiment according to FIG. 1.

FIG. 3 shows an electron microscope image of the three-dimensional porous structure of the metal foam 18. On the basis of the specified scale, it can be seen that the pores P have an average diameter of more than 100 µm, that is, are relatively large.

The porous metal foam 18 of the discharge element extends essentially over the entire thickness d of the discharge element. "Essentially" means that the porous metal foam 18 extends over at least 70%, but preferably over at least approximately 80% of the thickness d of the positive electrode 4. The active material made of LFPS is distributed essentially homogeneously in the porous metal foam 18, such that the cell function is only slightly impaired by any deviations in the homogeneous distribution.

The positive electrode 4 comprises a binder to improve the mechanical strength. This binder is THV.

The negative electrodes 5 comprise carbon as an active material in a form suitable as an insertion material for the absorption of lithium ions. The structure of the negative electrode 5 is similar to that of the positive electrode 4. In the case of the negative electrode 5, the discharge element preferably also has a three-dimensional porous metal structure in the form of a metal foam. The negative electrode 5 also has a relatively high loading of active material of at least 2.5 mAh/cm² and a corresponding thickness.

Example 1: Production of LFP Electrodes as Comparison Electrodes

The production of the LFP electrodes was performed as described in the following:

A paste was first prepared from the following components:

| | |
|---|---|
| approx. 92-96% by weight | lithium iron phosphate (LFP, LiFePO$_4$) without sulfur doping |
| approx. 0-4% by weight | carbon black as conductivity mediator |
| approx. 2-6% by weight | THV as a binder |

The binder was first dissolved in the solvent acetone for this purpose. The carbon black was then added to the solution with stirring. Finally, LFP was also added alternately with further solvent with stirring. The paste prepared was introduced homogeneously into a metal foam having an initial porosity of more than 90% and dried at 50° C. for one hour. After cooling, the electrode material, that is, the LFP introduced homogeneously into the metal foam, was pressed together to a thickness of 0.5 mm by means of a calender, starting from an initial thickness of 1.6 mm. It was then subjected to a tempering process at 180° C. Pieces having an area of 1 cm² were punched out of this pressed and tempered electrode material to obtain the LFP electrode.

The LFP electrodes were used as comparison electrodes in the experiments described below. They had a theoretical capacity of approx. 14 mAh. They were examined in a half-cell having a three-electrode arrangement, wherein the reference and counter electrodes each consisted of metallic lithium. The electrolyte used in the half-cell had the composition LiAlCl$_4$*1.5 SO$_2$.

Example 2: Production of LFPS Electrodes

The LFPS electrodes were produced according to the method described in Example 1 for the production of the LFP electrodes.

However, the following components were used to prepare the paste:

| | |
|---|---|
| approx. 92-96% by weight | sulfur-doped lithium iron phosphate (LFPS) |
| approx. 0-4% by weight | carbon black as conductivity mediator |
| approx. 2-6% by weight | THV as a binder. |

Said LFPS electrodes having a theoretical capacity of 14 mAh were also examined in a half-cell having a three-electrode arrangement, wherein the reference and counter electrodes each consisted of metallic lithium. The electrolyte used in the half-cell had the composition LiAlCl$_4$*1.5 SO$_2$.

Experiment 1: Measurement of the discharge capacity as a function of the number of cycles in an LFPS electrode compared to an LFP electrode in a half-cell experiment.

The respective discharge capacity was determined as a function of the number of charge and discharge cycles (each with 1 C) in a half-cell experiment with the LFP electrode produced in Example 1 and the LFPS electrode produced in Example 2. It should be noted here that the two half-cells only differ in the positive electrode. This means that either the LFPS electrode or the LFP electrode was used as the positive electrode.

Figure 4:
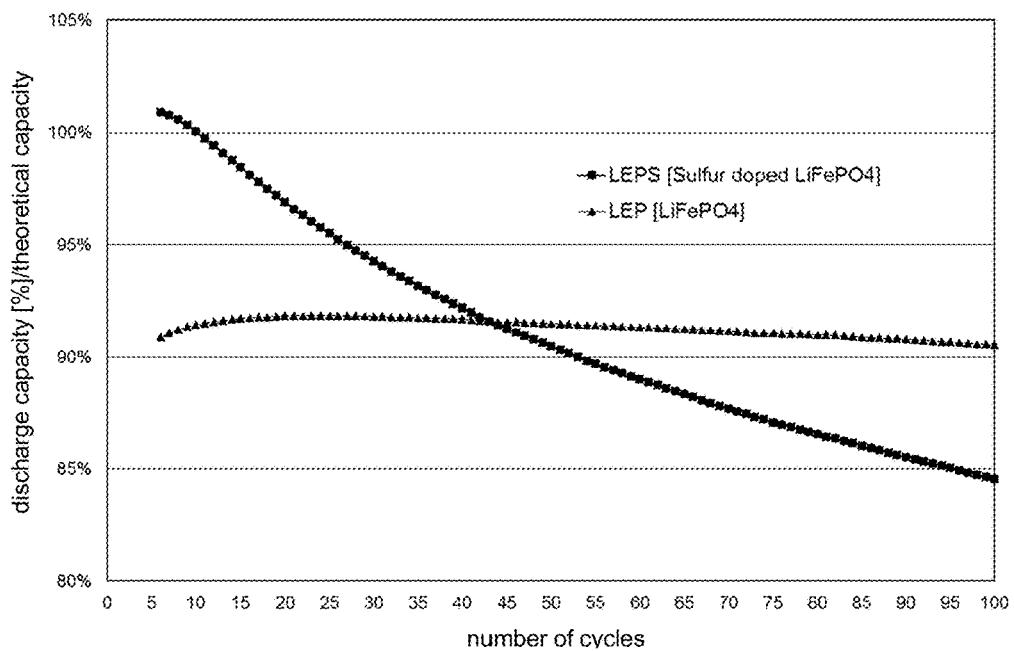
FIG. 4 shows the discharge capacity as a function of the number of cycles in the case of an LFPS electrode in comparison to an LFP electrode in a first half-cell experiment.

FIG. 4 shows the results obtained using an SO$_2$-based electrolyte, which comprised 1.5 moles of SO$_2$ per mole of conducting salt. Lithium tetrachloroaluminate (LiAlCl$_4$) was used as the conducting salt. For both electrodes, five IU initial cycles (not shown in FIG. 4) were performed at a charge/discharge current intensity of 10 mA in a potential range between 3.2-3.7 V until a current intensity of less than 1 mA was reached. These initial cycles served to determine the nominal capacity and to determine the charge and discharge rate. The IU initial cycles are a common charging/discharging method in which the current I is first set (discharge rate) until a certain potential or a certain voltage U is reached. One then waits until the current I has dropped to a specified minimum value (less than 1 mA). This is a common charging/discharging method.

100 IU cycles then begin at a charge and discharge rate of 1 C in a potential range between 3.2-3.7 V until a current intensity of less than 1 mA is reached.

In FIG. 4, the discharge capacity is plotted as a percentage of the theoretical capacity, which can be calculated from the formula composition of an active material, as a function of the number of charge and discharge cycles performed, wherein curve A relates to the LFP electrode and curve B to the LFPS electrode. The measurements were performed at room temperature.

It was initially determined here that the LFPS electrode, at the beginning, has a higher discharge capacity than the LFP electrode. A slight increase in discharge capacity can be seen at the beginning of both electrodes. The discharge capacity of both electrodes then falls with increasing number of cycles. The significantly steeper loss of capacity of the LFPS electrode is noticeable. After 45 cycles, the discharge capacity of the LFPS electrode has reached the value of the LFP electrode. The value is 92% of the theoretical discharge capacity. After 100 cycles, the LFP electrode still shows a discharge capacity of 91%. The discharge capacity of the LFPS electrode has dropped to a value of only 84% at this time. This means that the LFPS electrode having an SO$_2$-based electrolyte shows a strong loss of capacity compared to an LFP electrode in an electrochemical half-cell experiment.

On the basis of these results, it was not to be expected that, nevertheless, very good results could be achieved when using an LFPS electrode according to this disclosure in a full cell, that is, a rechargeable battery cell having an SO$_2$-based electrolyte.

Experiment 2: Measurement the discharge capacity as a function of the discharge rate for an LFPS electrode compared to an LFP electrode in a half-cell experiment.

100 charge and discharge cycles were performed in the half-cells to determine the discharge capacity of the LFPS electrode and the LFP electrode at different current loads in an $SO_2$-based electrolyte. The charging was performed at an equal charging rate of 1 C in each case. A discharging process took place after each charging process, wherein the half-cells were discharged in the 100 cycles at the following rates:

10 cycles at 1 C
10 cycles each at 2 C, 4 C, 8 C and 10 C,
50 cycles at 1 C.

The charging took place up to a voltage of 3.7 V. The discharge was ended at a voltage of 3.2 V.

Figure 5:
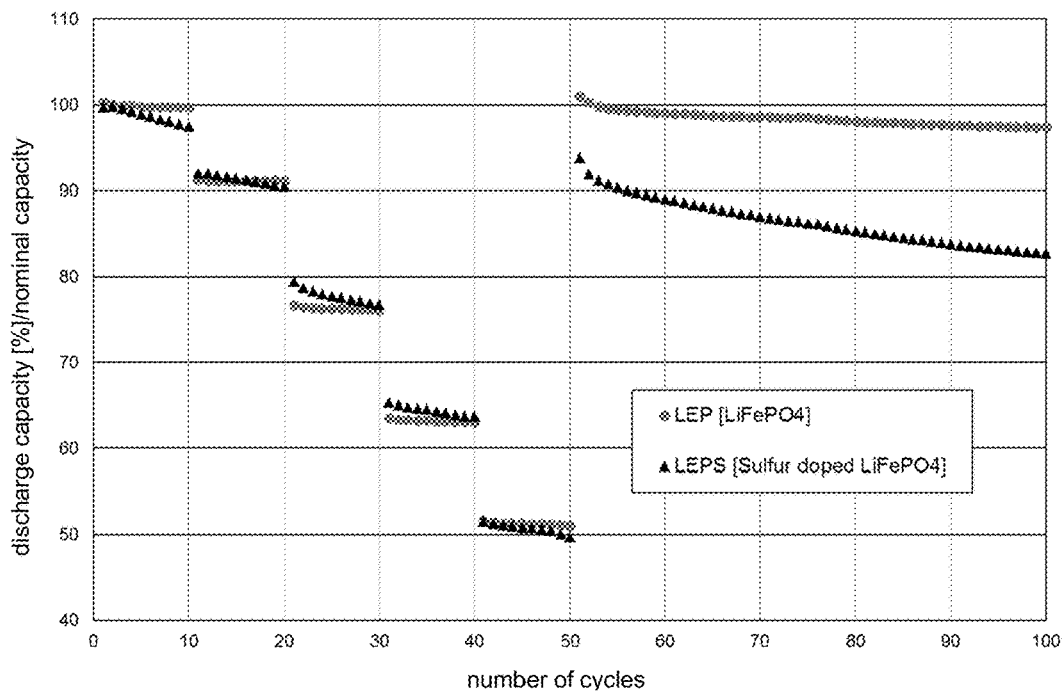
FIG. 5 shows the discharge capacity as a function of the discharge rate of an LFPS electrode in comparison to an LFP electrode in a second half-cell experiment.

In FIG. 5, the discharge capacity is plotted as a percentage of the nominal capacity as a function of the number of charge and discharge cycles performed, wherein curve A relates to the LFP electrode and curve B to the LFPS electrode. The nominal capacity is the discharge capacity that could be discharged from the respective electrode in the first cycle shown. The measurements were performed at room temperature.

At the first discharge cycle at 1 C, a drop in the discharge capacity of the LFPS electrode can be seen in the course of the ten cycles. The LFPS electrode and the LFP electrode are almost identical when discharging at 2 C. At 4 C and 6 C discharge currents, the LFPS electrode starts with a higher discharge capacity, which approaches the curve of the LFP electrode in the course of the cycles. At 8 C, the LFPS electrode shows a steeper loss of capacity with the same starting value as the LFP electrode. Another 50 cycles were performed at a rate of 1 C after the 40 cycles at increasingly higher discharge rates. The starting value of the LFPS electrode is 94% of the nominal capacity and is therefore much lower than the nominal value of the LFP electrode (101%). The difference between the two electrodes is even more severe after 100 cycles. The LFPS electrode is 83% of the nominal capacity, the LFP comparison electrode is 97% of the nominal capacity.

It can be concluded from this that the LFPS electrode having an $SO_2$-based electrolyte does not show any improved performance at higher discharge rates compared to an LFP electrode in a half-cell experiment. In the case of the LFPS electrode, the discharge capacity also drops significantly after the high-current discharges.

On the basis of these results, also, it was not to be expected that good results would nonetheless be achieved when using an LFPS electrode according to this disclosure in a rechargeable battery cell, that is, a full cell having an $SO_2$-based electrolyte.

Experiment 3: Measurement of the discharge capacity as a function of the number of cycles in an LFPS electrode compared to an LFP electrode in a full cell experiment.

Experiments were performed in full cells despite the poorer results of the LFPS electrode in Experiments 1 and 2 described above. Such a full cell consists of positive electrodes and negative electrodes which are arranged in a housing.

Experiment 3 was performed in a full cell that had two negative electrodes having an active material made of carbon, an $SO_2$-based electrolyte having $LiAlCl_4$ as the conducting salt and either an LFPS electrode or an LFP electrode as the positive electrode. The positive electrodes were loaded with active material, that is, with LFPS or LFP, of approx. 90 mg/cm². The nominal capacity of the cells was approx. 100 mAh. The nominal capacity is obtained by subtracting from the theoretical capacity of the positive electrode that capacity that is consumed in the first cycle for the formation of a coating layer on the negative electrode. Said coating layer is formed on the negative electrode when the full cell is charged for the first time. Lithium ions are irreversibly consumed for this formation of a coating layer, so that the full cell has less cyclic capacity available for the subsequent cycles. The cells thus differed only in the kind of the active material used in the positive electrode.

A plurality of cycle experiments was performed. The full cells were charged at 1 C, corresponding to a current of 0.1 A up to an end-of-charge voltage of 3.6 volts and a drop in the charge current to 40 mA. The full cells were then discharged at the same current intensity until a potential of 2.5 V was reached. There was a ten-minute break between charging and discharging the full cells.

The determined discharge capacities are expressed as a percentage of the nominal capacity.

In each measurement, two types of full cells were examined, which differed in the active material used. The curves shown show the mean value from two identical measurements (for the LFPS electrodes) or three identical measurements (LFP electrodes).

Figure 6:
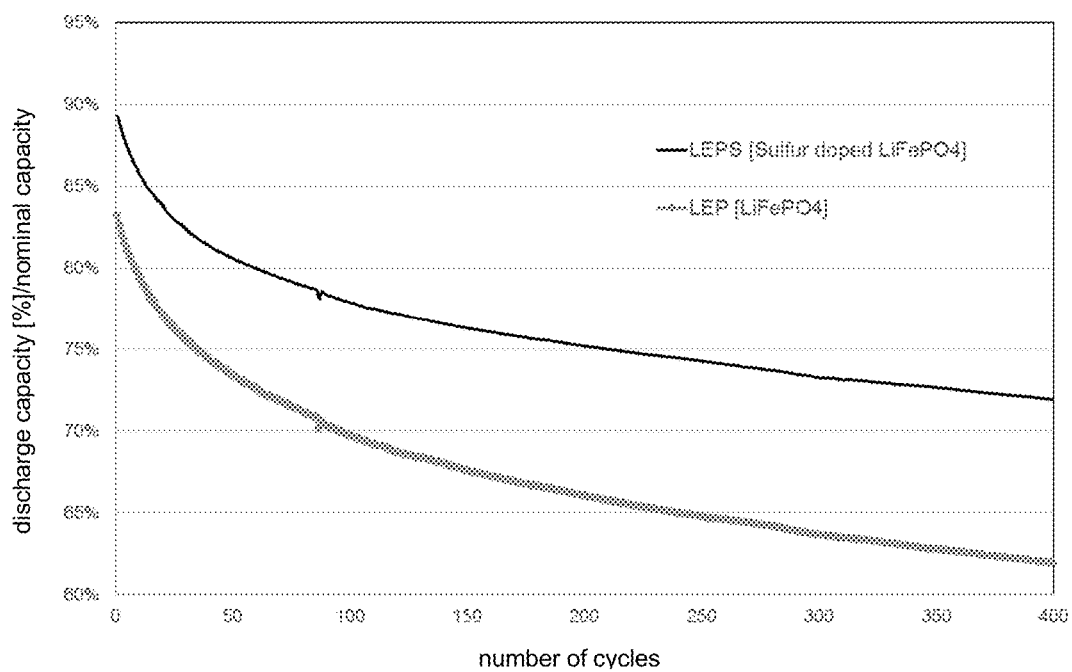
FIG. 6 shows the discharge capacity as a function of the number of cycles in the case of an LFPS electrode in comparison to an LFP electrode in a first full cell experiment.

The results of this experiment are plotted in FIG. 6. The starting value of the full cell having the LFPS electrode is approx. 90% of the nominal capacity. The starting value of the full cell having the LFP electrode was approx. 83% of the nominal capacity. Both electrodes show a loss of discharge capacity over the number of cycles. The loss of capacity for the full cell having the LFPS electrode was 18% up to the 400th cycle and then showed a remaining capacity of 72%. The full cell having the LFP electrode had a loss of discharge capacity of 21% and had a remaining capacity of 62% after 400 cycles. The full cell having the LFPS electrode thus surprisingly shows a more stable long-term behavior.

These results were unexpected and surprising, since the half-cell experiments performed previously showed a significantly different behavior.

Experiment 4: Measurement of the discharge capacity as a function of the number of cycles in an LFPS electrode compared to an LFP electrode in a full cell experiment.

After the very good results in full cells having three electrodes, further full cells having eleven positive and twelve negative electrodes were examined. The full cells differed only in the type of active material used for the positive electrode.

The negative electrodes comprised an active material made of carbon, the electrolyte consisted of an electrolyte based on $4.5 \times SO_2$ with $LiAlCl_4$ as the conducting salt ($LiAlCl_4 \times 4.5\ SO_2$). The positive electrodes comprised either LFPS or LFP as an active material. The loading of the positive electrodes with active material was approx. 90 mg/cm². The nominal capacity of the cells was approx. 1000 mAh.

A plurality of cycle experiments was performed. The cells were charged at 1 C, corresponding to a current of 0.1 A up to an end-of-charge voltage of 3.6 volts and a drop in the charge current to 20 mA. The cells were then discharged at the same current intensity until a potential of 2.5 V was reached. There was a ten-minute break between charging and discharging.

The determined discharge capacities are expressed in % of the nominal capacity. The nominal capacity is obtained by subtracting, from the theoretical capacity of the positive electrode, that capacity that is consumed in the first cycle for the formation of a coating layer on the negative electrode.

Figure 7:
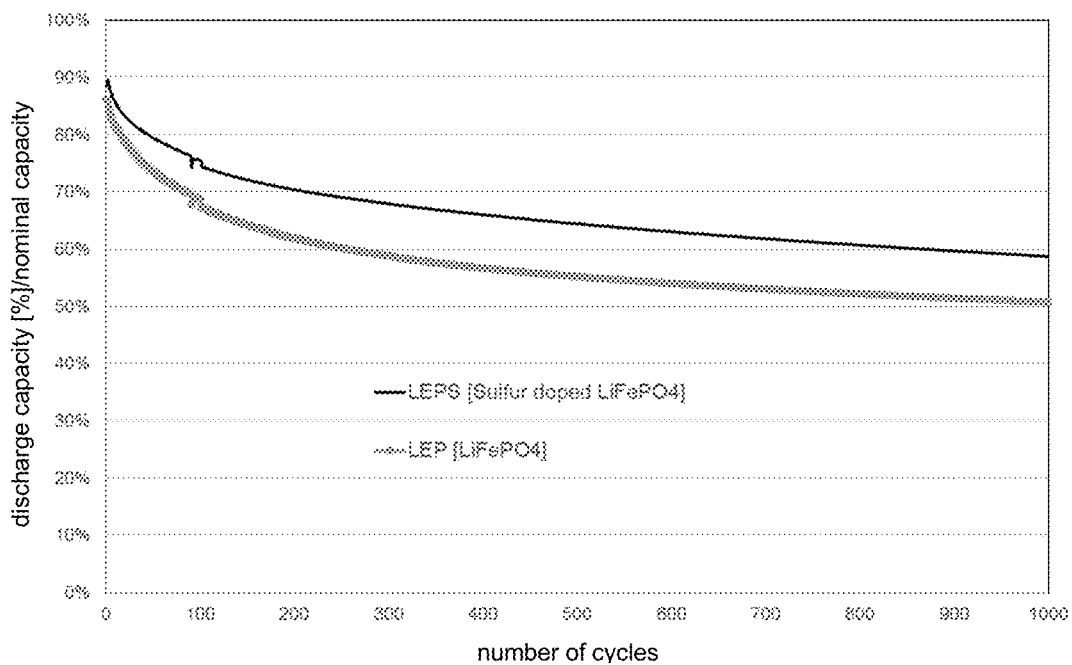
FIG. 7 shows the discharge capacity as a function of the number of cycles in the case of an LFPS electrode in comparison to an LFP electrode in a second full cell experiment.

The results of this experiment are plotted in FIG. 7. The curves shown are each the mean value from measurements with eight identical full cells having LFPS electrodes or four identical full cells having LFP electrodes. The starting value of the full cell having LFPS electrodes was approx. 89% of the nominal capacity. The starting value of the full cell having LFP electrodes was approx. 86% of the nominal capacity. Both electrodes show a loss of discharge capacity over the number of cycles. In the case of a full cell having LFPS electrodes, the loss of capacity is 24% of the nominal capacity up to the 500th cycle and 30% of the nominal capacity up to the $1000^{th}$ cycle. The discharge capacity is then 59% of the nominal capacity. The full cell having LFPS electrodes has a decrease of 31% (500th cycle) or 35% ($1000^{th}$ cycle) and is 51% of the nominal capacity at the end. The battery cells equipped with a plurality of LFPS electrodes thus also show a more stable long-term behavior.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. A rechargeable battery cell having a housing, at least one positive electrode, at least one negative electrode and an electrolyte comprising at least one conducting salt:
   wherein the electrolyte is based on $SO_2$; and
   wherein the positive electrode comprises an active material of the composition $A_xM'_yM''_z(XO_{4-m}S_n)$;
   A being an alkali metal, an alkaline earth metal, a metal from group 12 of the periodic table or aluminum,
   M' being at least one metal selected from a group consisting of the elements titanium, vanadium, chromium, manganese, iron, cobalt, nickel, copper and zinc,
   M'' being at least one metal selected from a group consisting of the metals of groups 2, 3, 4, 5, 6, 10, 11, 12, 13, 14, 15 and 16 of the periodic table,
   X being selected from a group consisting of the elements phosphorus and silicon,
   x being greater than 0,
   y being greater than 0,
   z being greater than or equal to 0,
   n being greater than 0 and
   m being at least 0.001 and less than or equal to n.

2. The rechargeable battery cell according to claim 1, wherein m has a value of at least 0.005.

3. The rechargeable battery cell according to claim 1, wherein A in the active material $A_xM'_yM''z(XO_{4-m}S_n)$ is the metal lithium, X is the element phosphorus and M' is the metal iron.

4. The rechargeable battery cell according to claim 1, wherein the positive electrode has a thickness of at least 0.25 mm.

5. The rechargeable battery cell according to claim 1, wherein the positive electrode has a mass of active material per unit area of at least 30 mg/cm$^2$.

6. The rechargeable battery cell according to claim 1, wherein a current-carrying capacity based on the area of the positive electrode is at least 10 mA/cm$^2$.

7. The rechargeable battery cell according to claim 1, wherein the positive electrode and/or the negative electrode is/are porous, wherein a porosity of the positive electrode is at most 50%.

8. The rechargeable battery cell according to claim 1, wherein characterized in that the positive electrode and/or the negative electrode has/have a discharge element having a three-dimensional porous metal structure in the form of a metal foam, wherein the porous metal structure optionally extends essentially over the entire thickness of the positive electrode and/or the negative electrode.

9. The rechargeable battery cell according to claim 8, wherein the active material of the positive electrode and/or the negative electrode is distributed essentially homogeneously in the porous metal structure.

10. The rechargeable battery cell according to claim 1, wherein the negative electrode comprises carbon as the active material.

11. The rechargeable battery cell according to claim 1, wherein the negative electrode has a thickness of at least 0.2 mm.

12. The rechargeable battery cell according to claim 1, wherein an amount of the active material of the negative electrode, based on its area, is at least 10 mg/cm$^2$.

13. The rechargeable battery cell according to claim 1, wherein the sulfur dioxide-based electrolyte comprises a concentration of $SO_2$ of at least 1.5 mol $SO_2$ per mole of conducting salt.

14. The rechargeable battery cell according to claim 1, wherein the conducting salt is an aluminate, a halide, an oxalate, a borate, a phosphate, an arsenate or a gallate of an alkali metal or an alkaline earth metal.

15. The rechargeable battery cell according to claim 1, wherein the rechargeable battery cell comprises a plurality of negative electrodes and a plurality of positive electrodes which are stacked alternately in the housing, wherein each positive electrode is enveloped by a sheath.

16. The rechargeable battery cell according to claim 1, wherein the positive electrode and/or the negative electrode comprises a binder present in a concentration of at most 20% by weight.

17. The rechargeable battery cell according to claim 16, wherein the binder comprises a fluorinated binder.

18. The rechargeable battery cell according to claim 17, wherein the fluorinated binder is a polyvinylidene fluoride and/or a terpolymer made from tetrafluoroethylene, hexafluoropropylene and vinylidene fluoride.

19. The rechargeable battery cell according to claim 16, wherein the binder consists of a polymer which is built up from monomeric structural units of a conjugated carboxylic acid or from the alkali, alkaline earth or ammonium salt of said conjugated carboxylic acid or from a combination thereof.

20. The rechargeable battery cell according to claim 16, wherein the binder consists of a polymer based on monomeric styrene and butadiene structural units.

21. The rechargeable battery cell according to claim 16, wherein the binder is selected from the group of carboxymethyl celluloses.

22. The rechargeable battery cell according to claim 1, wherein A is selected from the group consisting of sodium, calcium, zinc, and lithium.

23. The rechargeable battery cell according to claim 22, wherein A is lithium.

24. The rechargeable battery cell according to claim 1, wherein m has a value of at least 0.01.

25. The rechargeable battery cell according to claim 1, wherein m has a value of at least 0.05.

26. The rechargeable battery cell according to claim 1, wherein m has a value of at least 0.1.

* * * * *